July 25, 1939.   F. AMIOT   2,167,561
AIRCRAFT TURRET
Filed Jan. 24, 1938   3 Sheets-Sheet 1
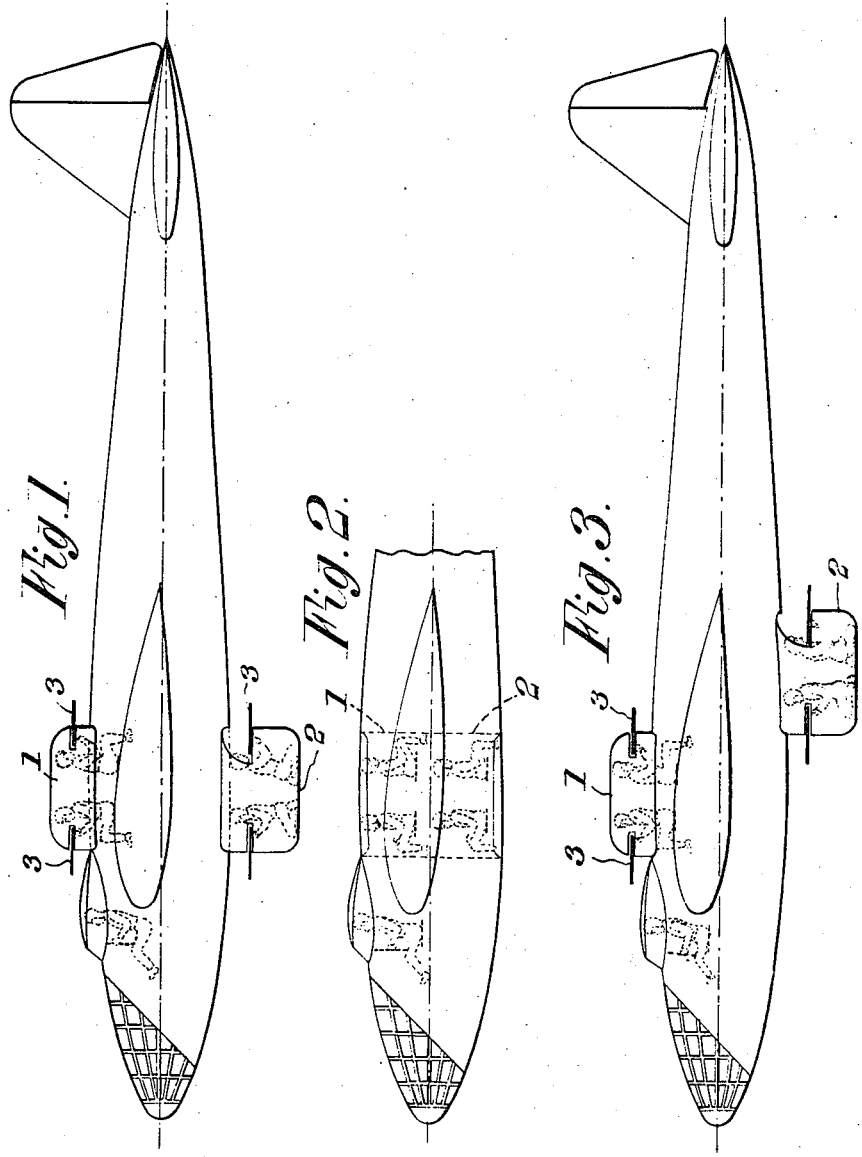
Inventor:
Félix Amiot
Attorneys

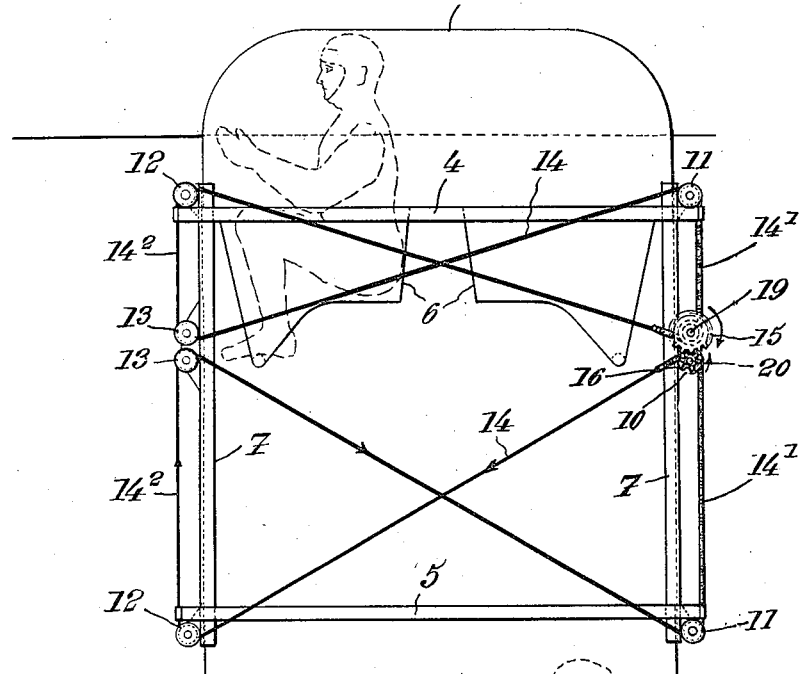

July 25, 1939.　　　　F. AMIOT　　　　2,167,561
AIRCRAFT TURRET
Filed Jan. 24, 1938　　　3 Sheets-Sheet 3

Inventor:
Félix Amiot
Attorneys

Patented July 25, 1939

2,167,561

UNITED STATES PATENT OFFICE 2,167,561

AIRCRAFT TURRET

Félix Amiot, Neuilly-sur-Seine, France

Application January 24, 1938, Serial No. 186,746
In Luxemburg January 25, 1937

3 Claims. (Cl. 89—37.5)

The present invention relates to aircraft turrets and it is more especially, although not exclusively, concerned with airplanes of this kind.

The chief object of the present invention is to provide a flying machine of this type which is better adapted to meet the requirements of practice and especially which permits firing in all directions and ensures switching into fighting order so quickly that it makes reflex firing possible, while preserving the best possible lift/drag ratio.

The essential feature of the present invention consists in fitting aircraft of the type above mentioned with fighting turrets, each preferably including several guns capable of firing in different directions, mounted in a retractable manner so as to be movable together with their crews, which can thus remain constantly at their fighting stations, the whole being such that the time necessary for opening fire with said guns is reduced to that necessary for projecting said turrets into expanded positions.

In the following specification and claims, it should be well understood that the word "turret" is taken in its broadest meaning, including any closed structure containing at least one gun and room for the gunner or gunners.

According to another feature of the present invention, the aircraft of the type with which the present invention is concerned include at least two fighting turrets, corresponding respectively to two distinct zones of space, for instance the space above the aircraft and the space below it, these two turrets being arranged in such manner that they can be fully retracted inside a fairing of aerodynamic shape as pure as possible and constituted for instance by the fuselage, in the case of an airplane.

Still another feature of the present invention consists in providing an aircraft of the type above referred to with two retractable fighting turrets the displacements of which are simultaneous.

Other features of the present invention will result from the following detailed description of some specific embodiments thereof.

Preferred embodiments of the present invention will be hereinafter described, with reference to the accompanying drawings, given merely by way of example, and in which:

Fig. 1 is an elevational view showing, in a diagrammatic manner, an airplane fitted with fighting turrets retractable according to the present invention, these turrets being shown, in this view, in the expanded position;

Fig. 2 is an elevational view, similar to Fig. 1, with the rear part of the fuselage cut away, showing the fighting turrets in the retracted position, inside the fuselage;

Fig. 3 is a diagrammatic elevational view of an airplane of the same kind made according to another embodiment of the invention;

Fig. 4 is an elevational view, on an enlarged scale, of the system of retractable fighting turrets according to the present invention, as fitted on an airplane of the type of that disclosed by Fig. 1, this view also showing the means for operating said turrets;

Fig. 7 is an end view of a part of Fig. 6.

Figure 5:
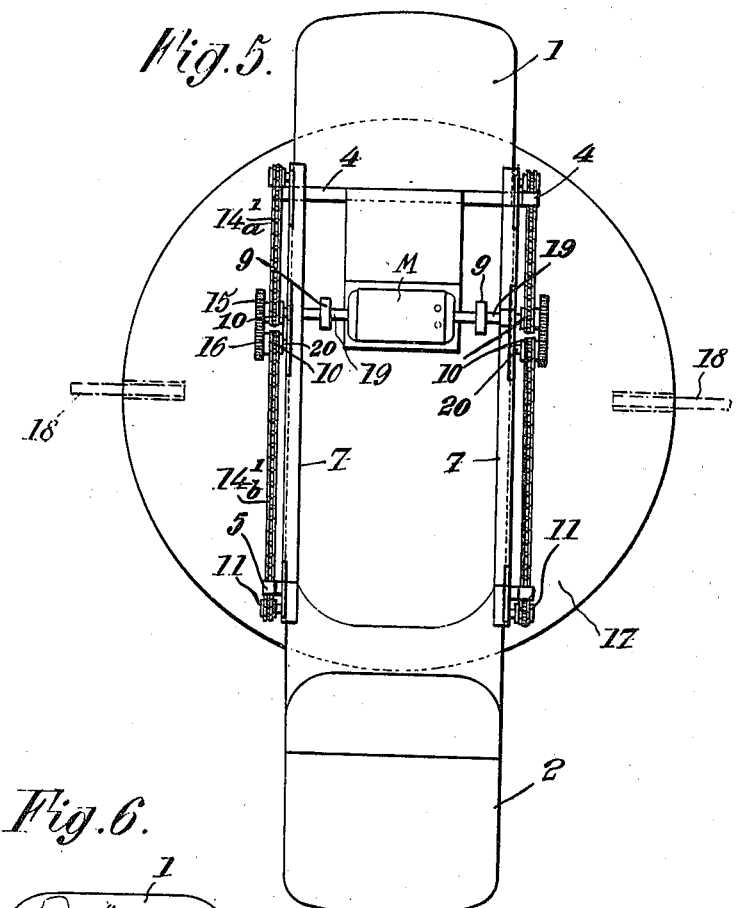
Fig. 5 is a diagrammatic end view corresponding to Fig. 4.

In the following specific description, it will be assumed that it is desired to provide a fighting plane with which it is possible, in any position, to fire in the direction of an enemy present in any portion of the space around the airplane.

First, it should be remarked that, up to now, the most practical solution to this problem that had been suggested consisted in fitting on the airplane structure, in a fixed manner, fighting turrets or the equivalent which projected in suitable manner from the fuselage. As a rule, according to this construction, there was provided a pair of fighting turrets, to wit an upper turret and an under turret, intended to fire respectively in the portions of the space located above and below the aircraft, each of these turrets being fitted with several guns corresponding each to a distinct zone of action of sector in the portion of the space corresponding to the turret.

Such a solution of the problem makes it possible to keep the gun crews constantly at their fighting stations, near the guns, but it does not any longer correspond to the requirements of practice, because the turrets, although suitably faired, considerably increase the drag and reduce the speed of the aircraft in an exaggerated manner.

On the other hand, it is known to provide on the fuselage rotary turrets which are partly or wholly retractable. But with arrangements of this kind it is impossible to act sufficiently quickly when an enemy appears in the sky. This is due to the fact that, after the turret has been expanded, the gunner must enter it, and the whole must be turned through an angle corresponding to the field of action that is considered. Therefore too long a period of time elapses between the appearance of the enemy and the time at which the gun is capable of firing. On the other hand, it is impossible to act simultaneously in several distinct sectors.

The arrangement according to the present invention makes it possible both to preserve, under normal conditions of flight of the aircraft, the best possible lift/drag ratio, and to act within the shortest possible time aaginst an enemy either in one sector or in several sectors simultaneously.

With these objects in view, according to present invention, the airplane, considered as a whole, is devised in such manner that the lift/drag ratio is as high as possible. For instance, said airplane may be advantageously made of the monoplane type, as shown by the drawings, with a fuselage of streamlined shape as pure as possible, the transverse sections thereof being, for instance, circular, as shown by the drawings, or oval-shaped.

As for the armament of this airplane, it is so devised that it is retractable, preferably in a complete manner, inside the fuselage, and that, whatever be the position of the parts thereof, the crews can always remain near their guns or their instruments, in the positions they must occupy for working them.

It will be readily understood that, with such an arrangement, if the armament includes a multiplicity of guns or other firearms, corresponding to various sectors of the space, and if the means for bringing said armament into fighting position as soon as one enemy has been seen are sufficiently quick, it is possible to practise reflex firing in any direction whatever.

According to the arrangement which seems to be most favorable, the armament is placed in two turrets, such as 1 and 2 (Figs. 1 to 3 inclusive).

These turrets are arranged to comply with the following conditions:

They can be respectively projected above and below the mean horizontal plane of the fuselage, being for instance either located exactly above each other (Figs. 1, 2, 4 and 5) or located behind one another (Figs. 3 and 6), the whole being of course devised in such manner that the balance of the airplane is not disturbed when said turrets project outwardly from the fuselage; and They are each provided with several firearms such as guns 3, arranged in such manner as to be able to sweep respective sectors of the corresponding upper or lower field of action.

Concerning now the structure of these turrets, it may be of any known kind employed in connection with airplanes the armament of which is not retractable. For instance, these turrets can be constituted by boxes including for instance frames such as 4 or 5 (Figs. 4 and 5), to which frames are fixed covers with holes for the guns.

On the inside of these turrets, I provide seats 6 or floors for supporting the gunners. The latter may be in any position, for instance seated or kneeling, as shown, or lying or even standing, if there is room enough for this.

In the drawings, and in the embodiment having two turrets superposed above each other (Figs. 1 and 2), I have shown a structure of a size such that the gunners of the two turrets can be superposed in the seated position, without interfering with one another.

Concerning now the means for ensuring the displacement of the turrets, they can be made in many suitable manners, provided that they permit a quickness of movement as high as possible for passing from the retracted position to the expanded position. These means may include any suitable source of energy.

Preferably, and according to another feature of the present invention, these means are so devised that they ensure simultaneous movements of the respective turrets.

Furthermore, when these turrets are movable in the vertical direction, it is advantageous to take advantage of the differences of weight between the two turrets for obtaining one of the displacements under the effect of gravity.

For practical purposes, the lower turret will be made heavier than the other one and it will move the whole into fighting position. Besides, in any case, the displacement of said lower turret is generally greater, which corresponds to a greater work supplied by it.

In order to obtain such simultaneous displacements of the turrets, I may have recourse to either of the two following arrangements:

a. Both of the turrets are connected, separately, to the source of energy; and b. Only one of these turrets is connected to said source and suitable kinematic means are provided between said turrets for combining their respective movements.

When use is made of the action of gravity, I provide clutch means for disengaging, during the displacement produced by said action of gravity, the source of energy, which is to act only for displacement in the opposite direction.

Figure 6:
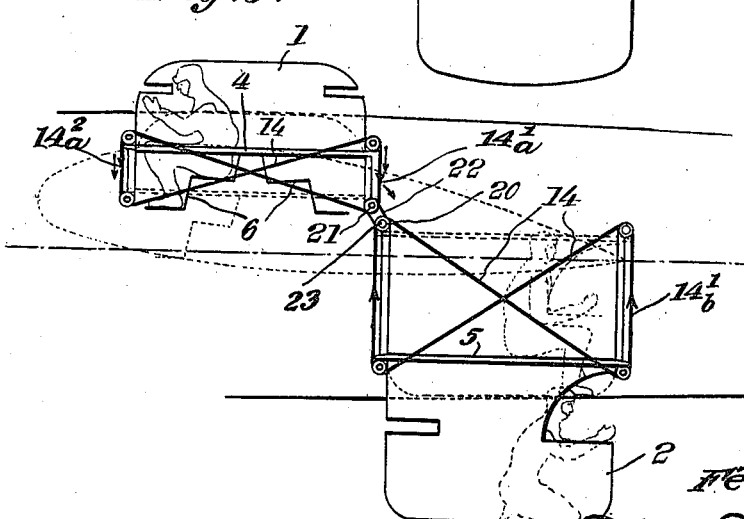
Fig. 6 is a view, analogous to Fig. 4, showing the arrangement of the system according to the present invention in the case of an airplane as shown by Fig. 3.

In the drawings, I have shown in Figs. 4 to 6 systems according to the invention which are driven by means of electric motors M. The frames 4, 5 which carry the turrets are, for instance, guided along suitable slideways formed by angle irons 7.

Motor M, which is mounted between slideways 7, is adapted to drive through clutches 9 two cable systems which make it possible to transmit forces to the four corners of frames 4 and 5. These systems include, for instance, endless cables $14a$, $14b$ passing over sprockets 10 and pulleys 11, 12 and 13. The cables are crossed so that the opposed vertical portions $14a^1$, $14a^2$ and $14b^1$, $14b^2$ respectively of said cables always move simultaneously in the same direction, either up or down. The turret frames 4, 5 are secured to these vertical cable portions, and thus vertical movements of the frames are obtained as the cables move. Portions $14a^1$ and $14b^1$ of the cables are formed as chains which engage the sprockets 10. The drive is transmitted to the frames 4, 5 through spindles 19 and 20 on which are mounted the sprockets 10, and spindles 19 are mounted in line with the motor shaft and driven therefrom through clutches 9.

If the amplitudes of the movements of the two turrets are different, I provide different ratios of transmission by making use of pinions 15, 16 of different diameters, respectively, for connecting shafts 19 and 20.

With a system of this kind, and supposing fighting turrets 1 and 2 to be in retracted position, it is sufficient for ejecting them outwardly, to disengage the clutch connections at 9, the desired movement being immediately obtained by the action of gravity. On the contrary, if it is desired to bring back the turrets into retracted position, the electric motor is started after having engaged the clutch connections 9. Frames 4, 5 then move inwardly so as to retract the turrets which are rigid therewith.

In Figs. 6 and 7, in which the turrets are located behind each other, I have shown, by way of example, a chain connection 22 between shaft 21 of motor M and spindle 20, the general operation of the system remaining unchanged. Chain 22 engages sprocket 24 on shaft 21 driven through coupling 9 from motor M, and sprocket 23 on stub shaft 20. Shafts 21 and 20 carry sprockets 10 for driving the chain portions $14a^1$ and $14b^2$ respectively of cables 14a and 14b.

Of course, when the turrets are being retracted, the guns are moved back inside the turrets, in such manner as not to interfere with the operation. Of course, it should be well understood that holes or housings such as 25 may be provided in the fuselage for receiving said guns.

According to still another feature of the present invention, the fighting turrets are made of a shape such that they leave laterally between themselves and the walls of the fuselage, free spaces 17 in which can be arranged firearms 18 (visible in dotted lines in Fig. 5) which make it possible to fire in lateral sectors.

Whatever be the embodiment that is chosen, I obtain a system the operation of which is believed to result sufficiently clearly, from the preceding description, to make it unnecessary further to explain it. This system has, over systems for the same purpose existing at the present time, the following advantages:

It permits reflex firing, in any direction, while maintaining, for the retracted position of the fighting turrets, the best possible lift/drag ratio for the airplane;

It includes only very simple devices for ensuring the rectracting.

This results from the fact that, owing to the kinematic systems which are shown (and which might be replaced by any others of the same kind) it is sufficient to apply the retraction or ejection effort at only one point.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

For instance, both of the turrets, with their armaments, might be of equal weights, so as to balance each other, and, in this case, the motive means for producing the outward movement of the turrets would have to overcome merely the frictional resistances due to displacement of the turrets in their guides.

What I claim is:

1. In an aircraft, a body, a pair of turrets, means mounting said turrets for movement into and out of the body in upward and downward movement respectively, and means operatively connecting said turrets for simultaneous movement into and out of the body whereby the weight of one turret at least partially balances the weight of the other.

2. In an aircraft as claimed in claim 1, the second turret being heavier than the first whereby said turrets may be moved out of the body by gravity.

3. In an aircraft, a body, a pair of turrets having their centers in the same plane transverse to the fore and aft axis of the aircraft, means mounting said turrets for rectilinear movement of their centers in said plane into and out of the body in opposite directions along the same axis, and means operatively connection said turrets for simultaneous movement into and out of the body.

FÉLIX AMIOT.